United States Patent [19]

Finnegan

[11] Patent Number: 5,106,497
[45] Date of Patent: Apr. 21, 1992

[54] OZONE TREATMENT SYSTEM UTILIZING AN AIR LIFT PUMP AS A MIXER AND AS A CIRCULATING MEANS

[75] Inventor: Don Finnegan, Wayne, N.J.

[73] Assignee: Advanced Oxidation Systems, Inc., Wayne, N.J.

[21] Appl. No.: 610,154

[22] Filed: Nov. 7, 1990

[51] Int. Cl.$^5$ .................................................. C02F 1/78
[52] U.S. Cl. ............................ 210/192; 210/205; 210/258; 210/259; 210/760
[58] Field of Search .............. 417/108; 210/760, 205, 210/258, 259, 192, 416.1, 416.2, 416.3, 188

[56] References Cited

U.S. PATENT DOCUMENTS

| | | | |
|---|---|---|---|
| 779,853 | 1/1905 | Hughes | 417/108 |
| 1,103,211 | 7/1914 | Knips | 210/760 |
| 3,382,980 | 5/1968 | Siwa | 210/123 |
| 3,748,262 | 7/1973 | Lee et al. | 210/760 |
| 3,835,039 | 9/1974 | Ciambrone | 210/192 |
| 4,007,118 | 2/1977 | Ciambrone | 210/760 |
| 4,098,691 | 7/1978 | Filby | 210/760 |
| 4,172,786 | 10/1979 | Humphrey et al. | 210/760 |
| 4,334,968 | 6/1982 | Sweeney | 210/753 |
| 4,555,335 | 11/1985 | Burris | 210/192 |
| 4,640,783 | 2/1987 | Kern | 210/760 |
| 4,764,283 | 8/1988 | Ashbrook et al. | 210/760 |
| 4,804,478 | 2/1989 | Tamir | 210/760 |

FOREIGN PATENT DOCUMENTS 2500947 7/1976 Fed. Rep. of Germany .

Primary Examiner—Robert A. Dawson
Assistant Examiner—Sun Uk Kim
Attorney, Agent, or Firm—Camoriano & Smith

[57] ABSTRACT

An ozone treatment system includes a compressor, an ozone generator, and an air lift pump.

5 Claims, 1 Drawing Sheet

OZONE TREATMENT SYSTEM UTILIZING AN AIR LIFT PUMP AS A MIXER AND AS A CIRCULATING MEANS

BACKGROUND OF THE INVENTION

The present invention relates to water treatment systems, and, particularly, to water treatment systems using ozone.

Ozone (chemical formula $O_3$) has been used extensively since the turn-of-the-century for treatment and purification of water such as municipal drinking water, swimming pool water, and cooling tower water. It is the most powerful oxidant available for water treatment and is unsurpassed in killing bacteria and other microorganisms.

In a typical application, ambient air is compressed in an air compressor. The air is then made extremely dry by an air drying system which can include air filters, a refrigerative drier, and a dessicant drier. The dry, filtered air then passes through an ozone generator which converts some of the oxygen ($O_2$) in the air to ozone. Pure oxygen can also be used to feed the ozone generator. The ozonated air is then mixed with water, in a gas-liquid contactor system, so that the ozone can dissolve into and treat the water.

Typically, the gas-liquid contactor system is a packed or plate column, bubble column, spray tower, injector or turbine, or an in-line static mixer. Each of these systems requires water pumps that consume energy and are relatively expensive to purchase and install.

There are several drawbacks to the existing ozone treatment systems. Both the compressor that is used to supply the necessary compressed air and the contact system pump consume valuable energy. Both the air compressor and the pump have moving parts that require maintenance. Both the air compressor and the pump are relatively expensive components of the ozone treatment system.

SUMMARY OF THE INVENTION

The present invention provides an ozone treatment system which eliminates the need for a circulation pump, thereby greatly reducing capital costs, installation and maintenance costs, and energy costs.

The present invention provides substantial energy savings in an ozone water treatment system by completely eliminating the energy that was formerly required to operate the circulation pump.

The present invention conserves energy by using the energy in the compressed air (or oxygen) to pump the water through the gas-liquid contact system.

DESCRIPTION OF THE PREFERRED EMBODIMENT

Figure 1:
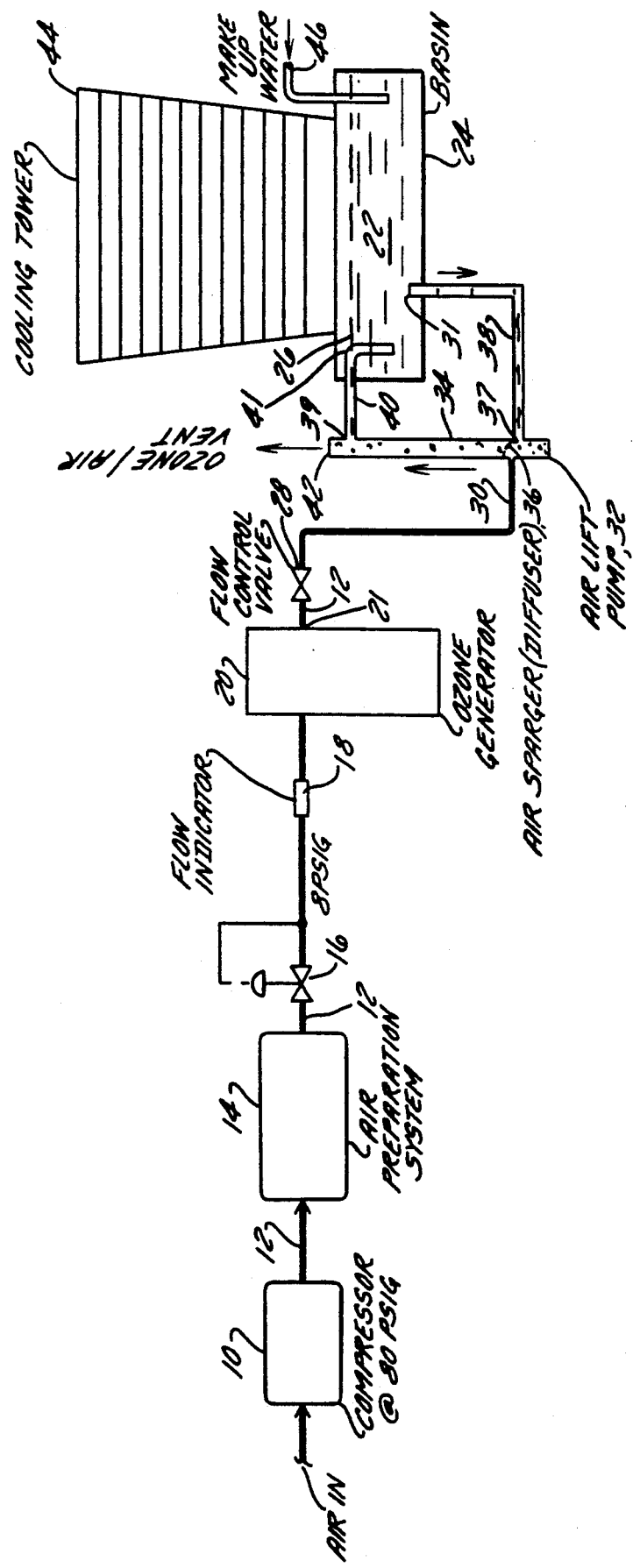
FIG. 1 is a schematic drawing showing one embodiment of the ozone treatment system of the present invention being used to treat cooling tower water.

As is shown in FIG. 1, a compressor 10 takes air from the atmosphere and compresses it to 15 or more pounds per square inch above atmospheric pressure (depending on the requirements of the type of air drier being used). In this particular embodiment, the air is being compressed to 80 pounds per square inch gage (80 pounds per square inch above atmospheric pressure). In the process of compression of the air, water vapor in the air condenses and forms water droplets. Water droplets, compressor lubricating oil, dust, and other contaminants may become entrained in the air stream.

The compressed air, with entrained water and other contaminants, leaves the compressor 10 through piping 12 and enters the air drying and filtering components, which are referred to collectively as the air preparation system 14. The drying and filtering components are well-known in the art. The compressor is usually mounted on a receiver tank which, because of its large diameter compared to the piping, is a low-velocity zone. When the velocity of the air is reduced in the receiver tank, most of the entrained water and contaminants settle out of the air stream. Usually the tank is followed by a series of pre-filters and coalescing filters, which further eliminate contaminants, especially oil and water aerosols. The air then enters an air drier, where the water vapor content of the air is reduced to a very low value.

The compressed air then leaves the air preparation system 14 through more piping 12, and the pressure of the compressed air is then adjusted by a pressure regulator 16 to the pressure at which optimal ozone production takes place (typically between 8 and 16 pounds per square inch above atmospheric pressure). A flow indicator 18 is in the line 12 to measure the amount of air flow.

The compressed air then flows into the ozone generator 20, which is preferably a corona discharge type of generator, although other types are known in the art and could be used in this system. The ozone generator 20 uses electrical energy to convert oxygen in the air to ozone. Alternatively, pure oxygen could be introduced into the ozone generator 20 and converted to ozone. In an ozone treatment system for treating cooling tower water, as is shown here, the system is sized to turn over the entire volume of water in the cooling tower system every four hours or less. In a typical cooling tower arrangement, the ozone treatment system can be designed so that each cubic foot per minute of ozonated air supplied by the air compressor will move 20 gallons per minute or more of water. The amount of ozone applied to the water (the application dosage) is sufficient to accomplish water purification and treatment. Typically, the dissolved ozone residual in the water 22 in the cooling tower basin 24 ranges from a maximum of 0.35 parts per million to trace amounts.

The air containing ozone leaves the ozone generator 20 through piping 12 at an outlet 21. The piping 12 may loop upward between the outlet 21 and the air sparger 36 to an elevation which is higher than the water level 26, or, as shown here, the outlet 21 itself may be at an elevation which is above the water level 26 in the cooling tower basin 24. The important point is that some part of the piping 12 between the ozone generator 20 and the air sparger 36 must be above the water level 26 in the basin 24 in order to avoid back-flow of water into the ozone generator 20 when the ozone generator 20 is off and pressure reaches ambient. The piping 12 then turns downward and enters the air lift pump 32 at an elevation which is substantially below the water level 26, and preferably substantially below the bottom of the basin 24.

In general, an air lift pump is a device for raising the elevation of a liquid using compressed gas. When the compressed gas enters the liquid, it mixes with the liquid, and the resulting liquid-gas mixture is less dense than the liquid alone. This less dense mixture is then displaced by the denser liquid, pushing the liquid-gas mixture upward. When the gas leaves the liquid, the liquid again becomes more dense and settles to the bottom. This change in density of the liquid thus permits the liquid to be pumped through a circuit, first rising (or being lifted up) as it mixes with gas and becomes less dense, then falling as the gas leaves. In this case, the gas under pressure is the ozonated air, and the liquid is the water from the basin 24.

The air lift pump 32 shown here includes a substantially vertical leg of piping 34. The piping 34 need not be vertical, but it must extend from a lower elevation where it receives water to a higher elevation where it discharges water. The diameter of the piping is sized to be small enough to avoid slippage (this occurs when the bubbles rise through the water without causing any lift), but large enough so that the pressure drop will not be overly restrictive to the flow. The diameter of the pipe is sized so that the velocity of the two-phase flow is between 8 and 20 feet per second. Since the air expands as the water-air mixture approaches the surface, the velocity increases as the mixture approaches the surface.

Near the bottom of the vertical leg 34 is an air sparger or diffuser 36, which is preferably made of sintered stainless steel or porous plastic and has many small openings, causing the air stream to break up into small bubbles as it contacts the water contained in the vertical leg 34. Slightly below the air sparger 36 is a water inlet 37 connected to a pipe 38, which connects the inlet 37 to the basin 24. As is shown in the drawing, the pipe 38 terminates at a tail piece 31, which is cut at a 45-degree angle to increase the intake surface area. The tail-piece 31 is raised slightly above the floor of the basin 24 to prevent debris on the floor from being dragged into the air-lift pump 32.

The water inlet 37 and air sparger 36 are positioned as low as possible below the basin 24 to enhance ozone tranasfer into the water and to maximize the flow rate through the air lift pump 32. The distance from the basin water level 26 to the air-water inlets is called submergence. In most cases the roof or floor upon which the cooling tower rests limits submergence. In some cases, the air inlet 36 and water inlet 37 can be positioned a great distance below the basin water level. In these cases the pressure of the air is the limiting factor for submergence. The air pressure has to be greater than the static head of the water column in order to initiate the air lift.

Near the top of the vertical leg 34 is a water outlet 39, which is positioned so that its centerline is at the water level 26. The outlet 39 should be at least partially above the water level 26. The water outlet 39 is connected to piping 40, which leads to the elbow 41 and into the basin 24. The piping elbow 41 terminates below the water level 26 and provides a water seal to prevent gaseous ozone from leaking into the basin area. Near the top of the vertical leg 34 is a vent 42, where the ozone gas and air are vented off and piped to a safe area or ozone destruct device.

The operation of the ozone treatment system is as follows:

The compressor 10 takes air at atmospheric pressure and compresses it. The compressed air with entrained water passes out of the compressor 10 and into the air preparation system 14, where it is filtered, dried, and prepared for the ozone generator. The air enters the ozone generator 20 at approximately 8 pounds per square inch above atmospheric pressure, some of the oxygen is converted to ozone, and the air then leaves the ozone generator 20. It passes through a flow control valve 28 and a piping 30 and then through an air sparger 36 and bubbles into the air lift pump. The inlet 37 of the air lift pump receives water from the basin 24, and, by introducing ozonated air bubbles into the water 22, causes the density of the water 22 to decrease as well as allowing the ozone to contact the water 22 for treatment. The denser water from the basin 24 pushes the less dense water in the air lift pump upward to the water outlet 39, to be returned to the basin 24. As the water moves through the air lift, a certain amount of ozone, depending on the ozone demand, is dissolved into the water. The gas which is not dissolved leaves the air lift through the off-gas vent connection 42. In this way, a level of ozone is maintained in the water for purification. As the water leaves through the water outlet 39 and is separated from the bubbles, it becomes dense again and returns to the basin.

Also shown in the drawing is a cooling tower 44, which is used to remove heat from the water 22 in the basin 24. The details of the heat exchange circuit followed by the cooling tower water 22 are not shown here, as many such heat exchange circuits are well-known in the art. A pipe 46 is shown which provides makeup water to the basin 24 to make up for the water that was evaporated in the cooling tower 44 so that the water is maintained at a relatively constant level 26.

Thus, in the ozone treatment circuit for the cooling tower water 22, energy is consumed by the system essentially in only two places. Energy is used by the compressor to compress the air, and energy is used in the ozone generator to generate the ozone. No additional energy is required to mix the ozone with the water or to circulate the water for treatment. The energy used to operate the compressor does not increase when the compressed air is used to pump the water, and, of course, the energy needed to operate the ozone generator is a function of the ozone demand of the water and, thus, is independent of the method used to mix the ozone with the water and circulate the water. Therefore, a substantial energy savings is achieved over the prior art.

Also, by eliminating the pumping and mixing apparatus of the prior art and replacing it with a simple air lift pump, capital costs, maintenance costs, and installation costs are greatly reduced. Thus, there is a savings not only in energy consumption but also in equipment and maintenance costs.

It will be obvious to those skilled in the art that modifications may be made to the apparatus described herein without departing from the scope of the present invention.

What is claimed is:

1. An ozone treatment system for treating water, comprising:
   a compressor;
   an ozone generator;
   an air lift pump; and
   piping connecting said compressor, said ozone generator, and said air lift pump together, so that gas leaving the compressor passes through the ozone generator and into the air lift pump, wherein said air lift pump serves both as a mixer, mixing the ozone with the water, and as a circulating means, circulating the water through the treatment system.

2. An ozone treatment system for treating water as recited in claim 1, wherein said air lift pump includes:
- a leg of pipe extending from a lower elevation to a higher elevation;
- a gas inlet near the bottom of said leg of pipe which receives gas from said ozone generator;
- a water inlet slightly below said gas inlet;
- a water outlet above said water inlet, wherein said water outlet is an opening defined in said leg of pipe which permits water to flow out of said leg of pipe; and
- a vent in said leg of pipe above said water outlet for venting excess gas.

3. An ozone treatment system for treating water from a basin in which a water level is maintained, comprising:
- a compressor;
- an ozone generator which receives compressed gas from said compressor; and
- an air lift pump, including
  - a leg of pipe extending from a low elevation, below said water level, to a higher elevation, above said water level;
  - a gas inlet in said leg of pipe below said water level, wherein said gas inlet receives ozone-containing gas from said ozone generator;
  - a water inlet in said leg of pipe slightly below said gas inlet;
  - piping from said basin to said water inlet;
  - a water outlet in said vertical leg of pipe slightly above said water level;
  - piping from said water outlet to said basin; and
  - a vent at the top of said vertical leg of pipe for safely venting excess gas.

4. In an ozone treatment system for treating fluid, comprising a compressor, which provides compressed gas to an ozone generator, a mixer for bringing the ozone from the ozone generator into contact with the fluid to be treated, and a pump for circulating the fluid to be treated, the improvement wherein:
- said mixer and pump comprise an air lift pump, which operates without requiring the addition of any energy to the system, said air lift pump receiving compressed air from the ozone generator, receiving the fluid to be treated, mixing the compressed air and the fluid, and causing the combined air and fluid to circulate through the system, said mixing and pumping functions being powered by the energy in the compressed air and requiring no additional expenditure of energy.

5. In an ozone treatment system as recited in claim 4, wherein the fluid to be treated is water from a basin, and said air lift pump includes an inlet, which receives water from the basin, and an outlet, which returns water to the basin.

* * * * *